(12) United States Patent
Kretzschmar et al.

(10) Patent No.: US 9,784,474 B2
(45) Date of Patent: Oct. 10, 2017

(54) SOLAR POWER TOWER RECEIVER

(71) Applicant: Stellenbosch University, Western Cape Province (ZA)

(72) Inventors: Holger Kretzschmar, Stellenbosch (ZA); Paul Gauché, Stellenbosch (ZA)

(73) Assignee: STELLENBOSCH UNIVERSITY, Stellenbosch, Western Cape Province (ZA)

( * ) Notice: Subject to any disclaimer, the term of this patent is extended or adjusted under 35 U.S.C. 154(b) by 385 days.

(21) Appl. No.: 14/396,894

(22) PCT Filed: Apr. 25, 2013

(86) PCT No.: PCT/IB2013/053287
§ 371 (c)(1),
(2) Date: Oct. 24, 2014

(87) PCT Pub. No.: WO2013/160872
PCT Pub. Date: Oct. 31, 2013

(65) Prior Publication Data
US 2015/0114385 A1 Apr. 30, 2015

(30) Foreign Application Priority Data
Apr. 26, 2012 (ZA) .................................. 2012/03064

(51) Int. Cl.
*F24J 2/10* (2006.01)
*F24J 2/04* (2006.01)
(Continued)

(52) U.S. Cl.
CPC .............. *F24J 2/10* (2013.01); *F24J 2/0477* (2013.01); *F24J 2/0488* (2013.01); *F24J 2/07* (2013.01);
(Continued)

(58) Field of Classification Search
CPC ...... F24J 2/0488; F24J 2/07; F24J 2/24; F24J 2/0477; F24J 2/10; Y02E 10/44; Y02E 10/41
See application file for complete search history.

(56) References Cited

U.S. PATENT DOCUMENTS 3,927,659 A 12/1975 Blake et al.
3,979,597 A 9/1976 Drucker
(Continued)

FOREIGN PATENT DOCUMENTS

WO 2004023048 A1 3/2004
WO 2008153922 A1 12/2008

OTHER PUBLICATIONS

International Search Report for PCT Application No. PCT/IB/2013/053287, dated Feb. 26, 2014 (4 pages).

*Primary Examiner* — Alfred Basichas
(74) *Attorney, Agent, or Firm* — Gordon R. Moriarty; Brian C. Trinque; Lathrop Gage LLP

(57) ABSTRACT

A central receiver for a solar power facility is provided comprising an arrangement of heat absorber tubes located in a chamber having a window that, in use, is to receive solar radiation reflected by a heliostat field. The heat absorber tubes extend transversely relative to the window and are connected into a working fluid circuit. The window forms an atmospheric air inlet and the chamber has an outlet in a region opposite the window. An air flow promoting fan induces a flow of atmospheric air inwards through the window, past the absorber tubes; and through the outlet. The receiver preferably includes multiple rows of unpressurized louvers or panes having oblique frontal surfaces such that reflected rays travel into the chamber and provide a leading row in which the temperature of the louvers is, under (Continued)

operating conditions, maintained at a level low enough to reduce thermal reflection and radiation losses.

14 Claims, 5 Drawing Sheets

(51) Int. Cl.
  *F24J 2/07* (2006.01)
  *F24J 2/24* (2006.01)
(52) U.S. Cl.
  CPC ............... *F24J 2/24* (2013.01); *Y02E 10/41* (2013.01); *Y02E 10/44* (2013.01)

(56) References Cited

U.S. PATENT DOCUMENTS

| | | |
|---|---|---|
| 4,047,517 A | 9/1977 | Arnberg |
| 4,263,895 A | 4/1981 | Colao |
| 4,312,324 A | 1/1982 | Ross et al. |
| 4,394,859 A * | 7/1983 | Drost .................. F24J 2/07 126/647 |
| 4,633,854 A | 1/1987 | Mayrhofer |
| 4,777,934 A | 10/1988 | De Laquil, III |
| 2008/0011290 A1 * | 1/2008 | Goldman .................. F24J 2/07 126/655 |

\* cited by examiner

SOLAR POWER TOWER RECEIVER

RELATED APPLICATIONS

This application is a 35 U.S.C. §371 filing of International Application No. PCT/IB2013/053287, filed Apr. 25, 2013, which claims priority to South African Patent Application No. 2012/03064, filed Apr. 26, 2012, each of which is incorporated herein by reference in its entirety.

FIELD OF THE INVENTION

This invention relates to a solar power tower receiver of the general type that is used in large solar power plants in which incoming solar radiation is concentrated on one or more central receivers via multiple tracking mirrors called heliostats. The central receivers are typically located on one or more towers that are positioned generally at the center of a heliostat field, at least in the sense of a central receiver servicing multiple heliostats. A central receiver serves to convert the solar radiation to thermal energy that is typically absorbed by a heat transfer fluid and used, either immediately, or after a period of thermal storage, in a power generating cycle.

BACKGROUND TO THE INVENTION

Receiver efficiency of a solar power receiver greatly affects the optimum operating point of a power plant and reduced receiver efficiency causes a decrease in the optimum operating point of a power plant. Receiver efficiency is typically reduced due to reflection losses, convection losses and radiation losses from a solar power receiver.

Reflection losses occur if a surface at the receiver is incapable of absorbing or transmitting an incident solar ray. The relationship between absorption, transmittance and reflection can be illustrated by the equation $1=\alpha+\rho+\tau$, where $\rho$ is the reflectance, $\tau$ is the transmittance and $\alpha$ is the absorbance. Convection losses are experienced if a small air particle gains energy from a surface at higher temperature, and carries the energy away from the receiver.

Radiation losses are mostly influenced by the surface area from which a material radiates, the view factor which the material has with respect to another material of different surface temperature and the temperature itself of the emitting material.

Over the years, many solar power receivers have been made in a number of different configurations in order to minimize the losses mentioned above. Prior receivers that can generate hot pressurized air include tubular receivers and closed volumetric receivers. Tubular receivers are termed indirectly-irradiated receivers due to the fact that the working fluid is not directly exposed to the concentrated solar irradiation. On the contrary closed volumetric receivers are regarded as directly-irradiated receivers.

Tubular receivers generally consist of multiple high temperature resistant metal alloy boiler tubes through which a working fluid is passed such as compressed air, water/steam, carbon dioxide or any other suitable working fluid.

In first generation tubular receivers the tubes were placed externally along the periphery of a cylindrical tower. However, convection and radiation losses were too high.

Thus, in the next generation of tubular receivers, the absorber tubes were placed in a chamber. The energy is absorbed by the absorber tubes and passed through the tube wall to the working fluid that is contained within a closed circuit.

Closed volumetric receivers, on the other hand, make use of a pressurized quartz window through which solar irradiation passes and strikes a porous absorber medium inside a pressurized chamber. Pressurized air moves through the absorber medium and thus gains thermal energy while cooling down the absorber medium. As a consequence of the physical characteristics of suitable quartz glass, and the fact that it needs to be cooled during use, certain difficulties present themselves in the use of such an arrangement.

A slight deviation from a closed volumetric receiver is an open volumetric receiver. Open volumetric receivers are also directly irradiated receivers. In this instance ambient air, instead of pressurized air, is sucked through the absorber medium that is exposed to concentrated solar radiation. No quartz window is used and the disadvantages associated with a quartz window are avoided. However, a limitation of an open volumetric receiver is that it can only be used in a Rankine cycle for the production of electrical energy. Pressurized air cannot be contained and thus cannot be used as a working fluid.

There is a need for an improved central receiver for receiving reflected solar radiation from a heliostat field.

SUMMARY OF THE INVENTION

In accordance with invention there is provided a central receiver for a solar power facility, the central receiver comprising an arrangement of heat absorber tubes located in a chamber having a window that, in use, is to receive solar radiation reflected by a heliostat field and wherein the heat absorber tubes extend transversely relative to the window and are arranged to be connected into a working fluid circuit, wherein the window forms an atmospheric air inlet and the chamber has an atmospheric air outlet in a region opposite the window, and an air flow promoting unit for inducing a flow of atmospheric air inwards through the window, past the absorber tubes; and through the outlet.

Preferably, a heat recovery heat exchanger communicates with the outlet from the chamber so as to receive residual heat contained in atmospheric air passing through the outlet from the chamber. The heat recovery heat exchanger may be connected into the working fluid circuit of the absorber tubes on the inlet side thereof so as to pre-heat working fluid flowing towards the absorber tubes. In this instance the air flow promoting unit induces a flow of heated atmospheric air through the heat recovery heat exchanger.

Further features of the invention provide for the air flow promoting unit to be a fan; for the working fluid circuit to be a closed circuit; for the absorber tubes to be arranged in series with each other, or more preferably, small groups of parallel absorber tubes are arranged in series with other small groups of parallel absorber tubes with one or a small group of absorber tubes being located in a position in which the internal temperature of a working fluid circulating through the absorber tubes is expected to be optimised or at its highest; for the absorber tubes to be arranged in multiple groups with optionally varying numbers and spacing of absorber tubes in different groups; for absorber tubes to be connected to other absorber tubes in a sequence that is chosen to optimise or maximise the absorption of thermal energy, particularly with absorber tubes having the highest temperature in use being located forwardly of rearmost absorber tubes; for the cross-sectional shape and size of the absorber tubes to be selected to optimise or maximise the absorption of thermal energy and the temperature to which a working fluid circulating through the absorber tubes is heated; and for the cross-sectional shape of the chamber to decrease from the window or atmospheric air inlet to the atmospheric air outlet such that the chamber may assume a truncated pyramidal, truncated conical or truncated parabolic shape.

Additional features of the invention provide for unpressurized louvers, panes, or rods typically of glass or quartz glass, to be positioned in front of the absorber tubes to reflect radiation received from a heliostat field inwards into the chamber and towards the absorber tubes and to inhibit the escape of re-radiation energy emitted by absorber tubes, especially those nearer the window; for the unpressurized transparent louvers, panes or rods to be arranged so as to form a non-continuous front profile directed generally towards the heliostat field with individual louvers, panes or rods having oblique frontal surfaces such that reflected rays travel towards the inside of the chamber of the receiver; and for the receiver to include multiple groups of unpressurized louvers, panes or rods arranged to provide a leading group in which the temperature of the louvers, panes or rods is, under operating conditions, maintained at a level low enough to reduce thermal losses, especially reflection and radiation losses.

Other features of the invention provide for the heat recovery heat exchanger to be a counter current type of heat exchanger that is optionally of a cross-flow type and may be arranged to function as a pre-heater for working fluid being supplied to the absorber tubes; and for air leaving the heat recovery heat exchanger to be recycled to the inlet to the window in order to preserve residual heat therein.

The temperatures to which a working fluid can be heated in a receiver according to the invention ranges widely from about 200° C. to about 1200° C. Most typically the temperature range of operation will be in the range of from about 400° C. to about 700° C.

A still further feature of the invention provides for the window to communicate with a compound parabolic or other reflector arranged to re-concentrate reflected radiation from the heliostat field prior to its entry into the window.

It will be understood that the central receiver defined above can be included in any suitable circuit for the purpose of power generation or thermal storage and the power generation may involve the use of the Rankine cycle; the Brayton cycle, or a combination Rankine/Brayton cycle.

In the Rankine cycle water is converted to steam, passed through a steam turbine to generate electricity, and cooled down via a steam condenser to water again.

A Brayton cycle makes use of air as working fluid wherein air is passed through a compressor; heated by a heat source; and flows through a gas turbine at high temperature.

A combined Rankine/Brayton cycle utilizes the thermal energy that remains in the outlet air stream from the Brayton cycle gas turbine to generate steam in a separate Rankine cycle. Thus the combined Rankine/Brayton cycle may be considered to have an enhanced efficiency.

In order that the invention may be more fully understood, various proposed embodiments and variations thereof will now be described with reference to the accompanying drawings.

DETAILED DESCRIPTION WITH REFERENCE TO THE DRAWINGS

Figure 1:
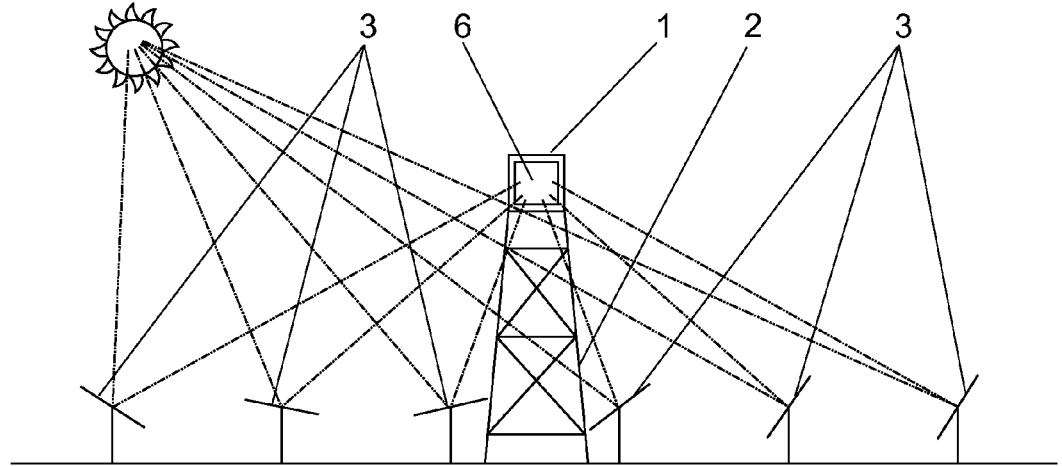
FIG. 1 is a schematic illustration of an arrangement of a heliostat field and a tower supporting a central receiver.

In the embodiment of the invention illustrated in the drawings a central receiver (1) for a solar power facility is mounted on the upper end of a tower (2) in a field of heliostats (3). The central receiver comprises an arrangement of transverse heat absorber tubes (4) located in a chamber (5) having a window (6) that, in use, is to receive solar radiation reflected by the heliostat field.

The window forms an air inlet for ambient air at atmospheric pressure to flow past and around the heat absorber tubes and an air outlet (7) is provided in an opposite region of the chamber such that air flows in through the window, past and over the absorber tubes, and out through the outlet.

The chamber (5) may be square in cross-section and it can be of any suitable shape from the window to the outlet such as rectangular, pyramidal, conical or parabolic. The angles for a pyramidal, conical or parabolic-shape of cavity will depend largely on the acceptance angle of the receiver.

The outlet communicates with a passage (8) in which a heat recovery heat exchanger (9) is located. This heat exchanger could be of any suitable type such as counter current or cross-flow. The heat recovery heat exchanger is connected into the closed circuit of the absorber tubes on the inlet side of the latter. The heat recovery heat exchanger is thus arranged to function as a pre-heater for working fluid being supplied to the absorber tubes. The heat recovery heat exchanger therefore receives residual heat contained in air passing through the outlet from the chamber with the temperature progressively decreasing towards the cooler remote end of the heat recovery heat exchanger.

The receiver in the illustrated embodiments of the invention includes an air flow promoting unit in the form of a fan (11) conveniently located at the outlet end of the passage for inducing a flow of air inwards through the window, across the absorber tubes, out through the outlet and through the heat recovery heat exchanger. This configuration reduces convection losses by sucking in atmospheric-air and recovering heat absorbed by that air in the heat exchanger.

The heat absorber tubes extend transversely relative to the window and are arranged to be connected into a circuit containing a working fluid that, in this particular instance, is air. Also, whilst not being essential, the circuit is, in this embodiment of the invention, a closed circuit and in such instances an alternative working fluid can be employed such as, for example, steam, molten salt, supercritical $CO_2$ and liquid sodium.

The heat absorber tubes are further arranged in co-planar groups with each coplanar group being spaced apart from other co-planar groups in the direction from the inlet to the outlet with the spacing between co-planar groups being generally even between a leading coplanar group indicated by numeral (4b) and a rearmost coplanar group indicated by numeral (4c).

Each coplanar group provides a predetermined free space for air to flow between adjacent heat absorber tubes and the free space will generally correspond to from about 75% of the area of the group in the instance of a leading coplanar group and about 50% or less in other instances. It should be noted that sufficient free space should be provided so as not to create an adverse pressure drop.

The heat absorber tubes are interconnected in small groups (that may, but need not correspond with the coplanar groups) that are in series with each other with one group of the absorber tubes, indicated for present purposes by numeral (4a), being in a position that will have to be determined for each individual receiver design, and in which the internal temperature of a working fluid circulating through the absorber tubes is expected to be optimised and at its highest. Such a position is typically forward of the rearmost coplanar group of absorber tubes (4c)

Figure 2:
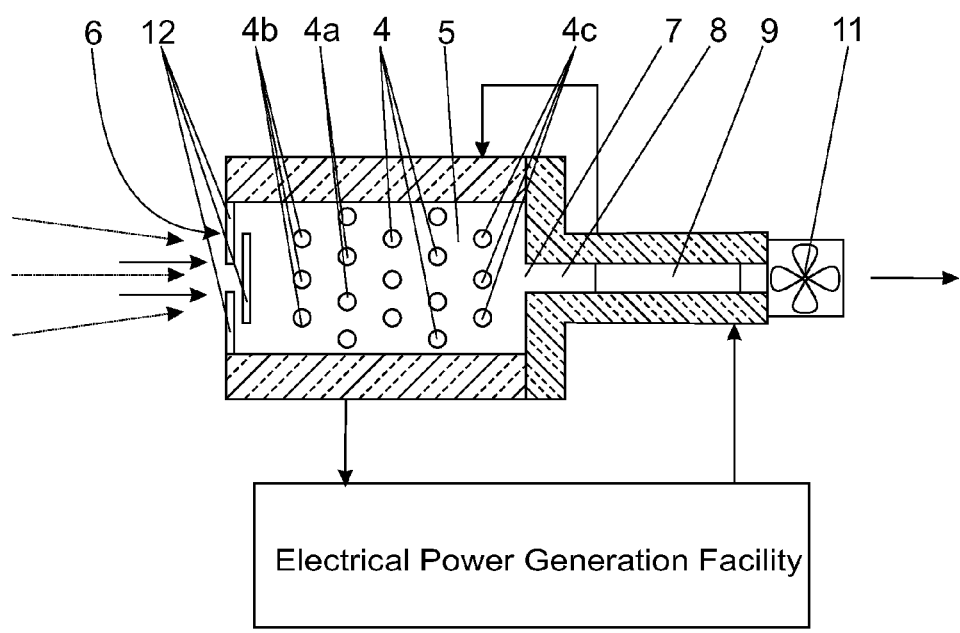
FIG. 2 is a schematic sectional side elevation of one simple embodiment of central receiver according to the invention.
Figure 3:
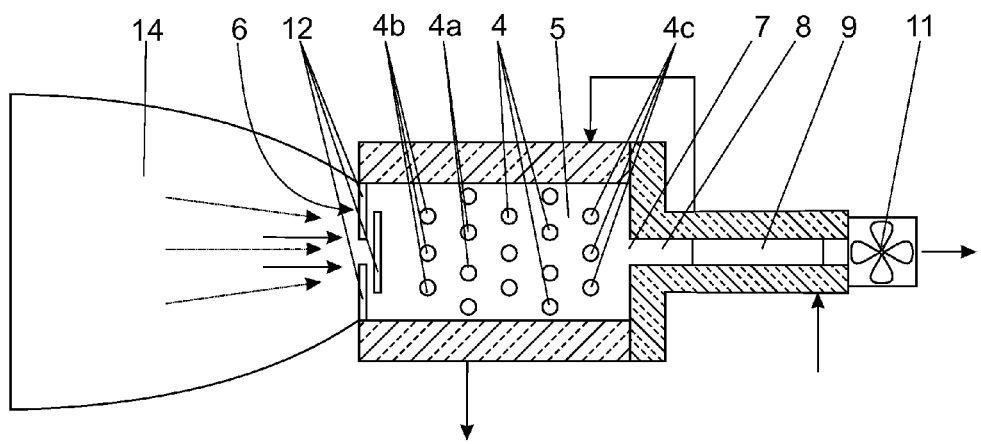
FIG. 3 is a schematic sectional side elevation of a second embodiment of central receiver according to the invention wherein a parabolic concentrating reflective surface surrounds the window.

The embodiments of the receiver of this invention that are shown in FIGS. 2 and 3 include multiple cylindrically-shaped absorber tubes that are arranged in multiple coplanar groups with the individual absorber tubes in each coplanar group being in a staggered position with respect to tubes in adjacent coplanar groups. With the spacing of the absorber tubes in each coplanar group being equal, the free space or airflow past a coplanar group of absorber tubes will be constant throughout the whole staggered configuration.

The absorber tubes (4) in different coplanar groups may also be arranged so as to provide different amounts of free space between the absorber tubes of different coplanar groups. A leading coplanar group may have fewer absorber tubes that may, for instance, provide 75% free space, whilst an innermost coplanar group may have a larger number of absorber tubes so as to provide, for example, 50% free space.

Figure 5A:
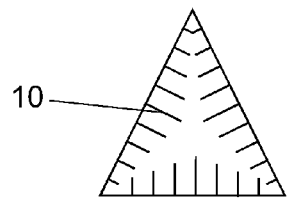
FIGS. 5a, 5b and 5c illustrate three alternative different cross-sectional shapes of tubes that can be used as absorber tubes.
Figure 4:
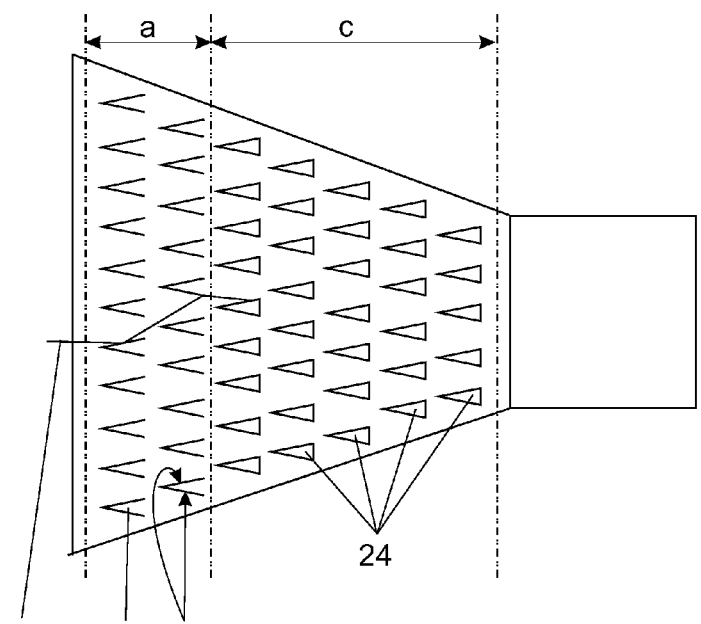
FIG. 4 is a schematic sectional side elevation of a third and somewhat more sophisticated embodiment of central receiver according to the invention.
Figure 5B:
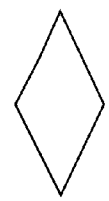
Figure 5C:
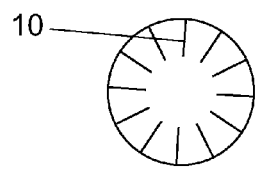
Figure 6:
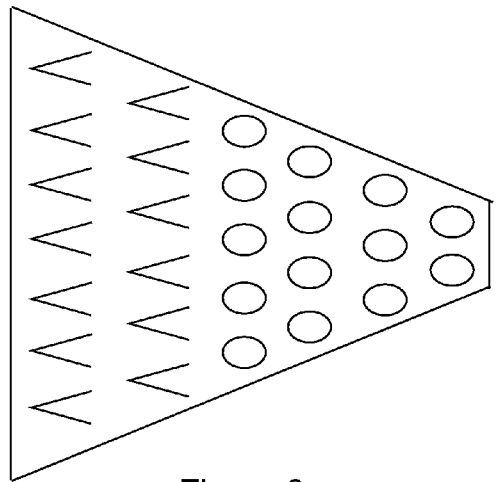
FIG. 6 is a schematic illustration of a simple louver arrangement with a further alternative arrangement of absorber tubes.
Figure 7:
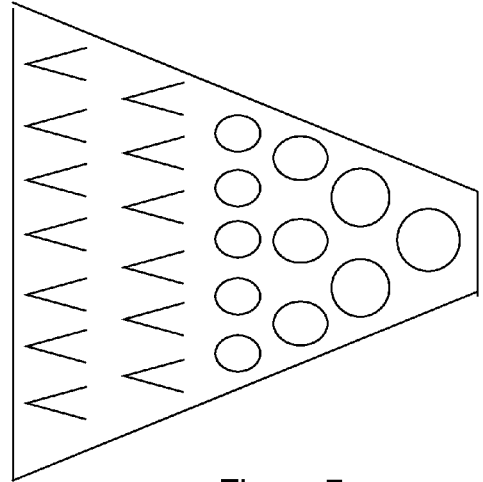
FIG. 7 is a similar schematic sectional side elevation of a further arrangement showing further alternative absorber tubes.

It will be appreciated that the absorber tubes may be of any other suitable shape in cross-section, including oval (see FIGS. 6 and 7), triangular-shaped (see FIGS. 4, 5a, 8, 9 and 10), diamond-shaped (see FIG. 5b), or circular with inwardly directed fins (10) (see FIG. 5c). The other shapes of tubes may also have heat transfer fins (10) on their inner surfaces as shown in FIG. 5a. Different absorber tubes may also have different diameters as shown in FIG. 7 as this may have an impact on the pressure drop and effective heat transfer.

In order to capture re-radiation energy emitted by the absorber tubes, especially the frontal or leading absorber tubes (4b), there may be provided unpressurized louvers or panes (12) (see FIGS. 2 and 3), typically of glass, infra-red grade fused silica quartz glass, or natural quartz glass, in front of the absorber tube arrangement and basically within the window. The arrangements shown in FIGS. 2 and 3 are simple forwardly directed flat louvers or panes that are staggered to provide for airflow past them. However, it is likely or even inevitable that such a simple arrangement will not only suffer from reflection losses but also from re-radiation losses.

This being so, and with reference to FIG. 4, multiple coplanar groups of louvers or panes (21) may be arranged so as to constitute a non-continuous surface profile. For this purpose, individual louvers or panes have oblique frontal surfaces (22) that are oriented such that reflected rays (23) travel towards the inside of the chamber of the receiver. The louvers or panes are conveniently arranged so that two frontal surfaces diverge from a leading edge of the louvers or panes as shown clearly in FIG. 4.

The non-continuous front profile reduces reflection losses by re-directing rays such that multiple absorptions or transmittances can take place in subsequent inner groups of louvers or panes and absorber tubes. The louvers may alternatively be of any other suitable cross-sectional shape, such as dome shaped, diamond shaped or flat so long as they fulfil the intended purpose.

As shown in FIG. 4, the receiver may be divided into a forward transparent zone "a" through which radiation is to pass on its way to a rear opaque zone "c". In the instance of the embodiment of the invention illustrated in FIG. 4, there are two coplanar groups of louvers or panes as described above that constitute the transparent zone and four coplanar groups of absorber tubes (24) that constitute the opaque zone. The absorber tubes in this instance are triangular in shape with the apex of the triangle directed towards the window and the absorber tubes of each coplanar group are off-set relative to those of the adjacent groups.

In all instances the louvers or panes require no special cooling since the ambient air stream impinging on them automatically cools them down. The transparent zone not only serves to reflect radiation inwardly into the chamber thereby preventing it from being reflected outwards in the general direction of the heliostat field but also serves to retain re-radiation within the chamber so that it either becomes absorbed by the absorber tubes or heats the air that passes through the chamber and becomes recovered by way of the heat exchanger.

Radiation losses from a receiver to the surroundings are greatly influenced by the temperature of the surfaces of the receiver that are exposed to the surroundings. The absorber tubes of the receiver are located within the chamber, which means that they are not exposed directly to the surroundings and consequently less radiation energy is lost from the warmer absorber tubes to the cooler surroundings. One of the objectives of any particular arrangement should therefore be to minimise the temperature of the leading louvers or panes to minimise radiation into the surroundings.

Figure 8:
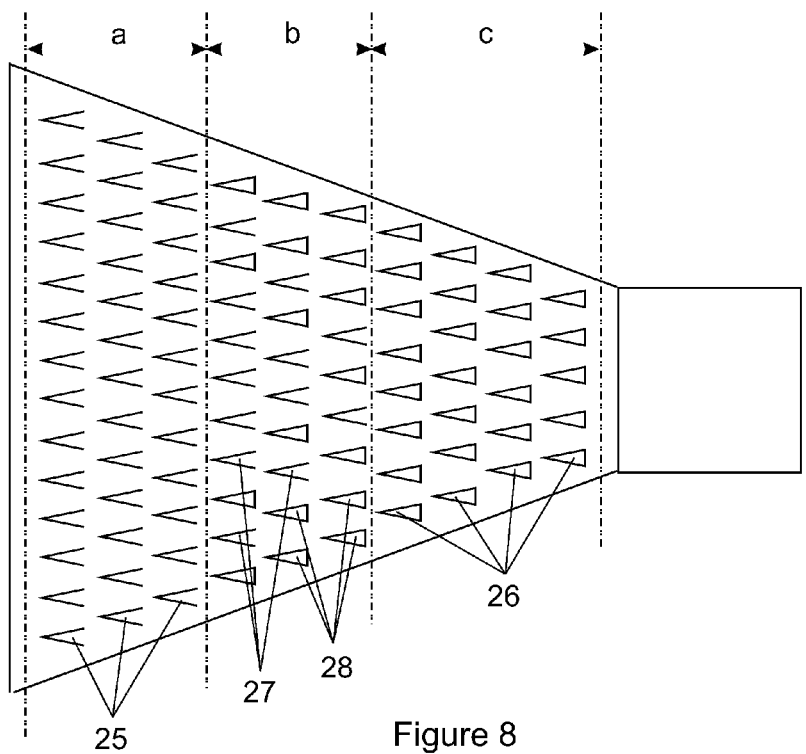
FIG. 8 is a similar schematic sectional side elevation of a more comprehensive louver and tube arrangement in which three distinct sections of the central receiver are shown.

In the instance of the embodiment of the invention illustrated in FIG. 8, there are three coplanar groups of louvers or panes (25) constituting the transparent zone; four coplanar groups of absorber tubes (26) constituting the opaque zone; and between those two zones there is an additional semi-transparent zone (b) that is composed of three coplanar groups composed of a mixture of louvers or panes (27) and absorber tubes (28).

Figure 9:
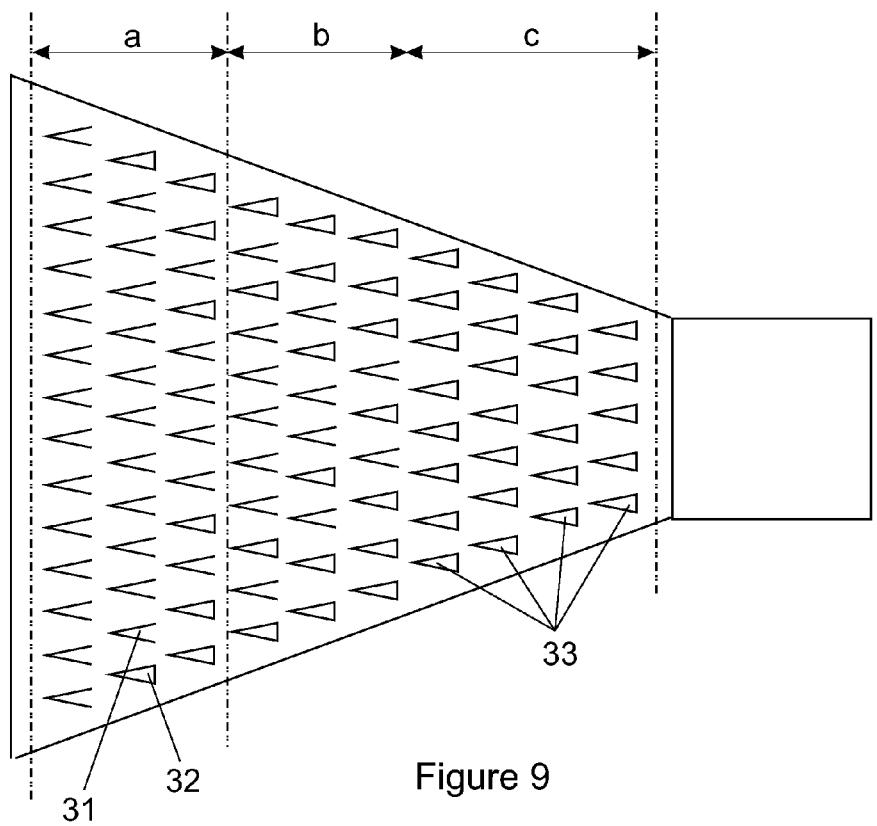
FIGS. 9 and 10 are similar illustrations of alternative arrangements of louver and absorber tube arrangements; and, FIG. 11 illustrates a composite central receiver assembly comprising multiple receivers according to the invention.

It is to be noted that the zones may overlap as shown in FIG. 9 in which the second coplanar group of louvers or panes (31) includes some absorber tubes (32) and successive coplanar groups have increasing numbers of absorber tubes in them until the last four coplanar groups are reached in which case all of the elements in a group are absorber tubes.

Figure 10:
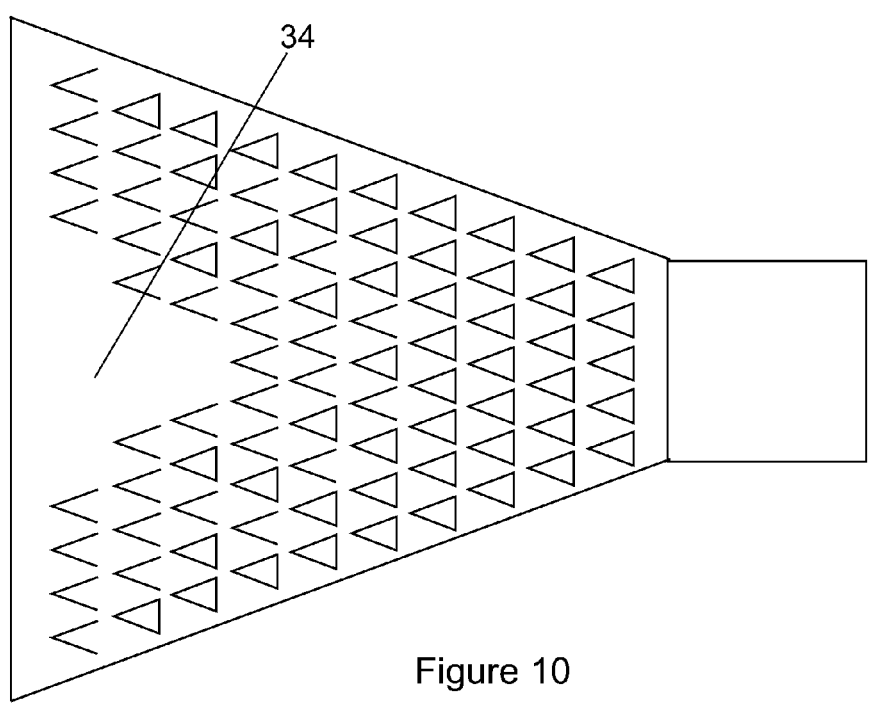

FIG. 10 illustrates a similar arrangement in which a central region (34) of the receiver has louvers or panes missing to provide, in effect, a recess in the leading edge of the receiver.

In the instance that the louvers or panes are quartz glass louvers, they may be transparent to wavelengths within the visible light spectrum (solar light) but black or opaque for wavelengths within the infra-red region. It is envisaged that these louvers can sustain temperatures up to approximately 1050° C. and it is believed that quartz glass has a transmittance of between about 90% and about 95% for the visible light spectrum. The louvers may absorb some of the thermal radiation, which causes them to heat up. The multiple group formation of the louvers will, however, reduce the temperatures of the louvers, especially towards the leading louvers or panes so that the temperatures of those exposed to the surroundings is sufficiently low to limit radiation losses. The transparent region extends from the window and typically comprises the multiple groups of unpressurized transparent louvers or panes. This region forms the low temperature region of the receiver. Its surface temperature is expected to be approximately one third of the highest temperature within the chamber.

A semi-transparent region may comprise a combination of quartz louvers and absorption tubes, such as silicon carbide (SiC) ceramic tubes or Inconel tubes. The quartz louvers and absorption tubes may be arranged in multiple groups. It is envisaged that the group closest to the transparent region comprises a large number of louvers and a small number of absorber tubes, each subsequent group having fewer louvers and more absorption tubes. It is appreciated that various suitable arrangements are possible.

The generally opaque region comprises only absorber tubes. These absorber tubes are typically SiC tubes, SiC panels or Incotel tubes.

Many alternatives exist to the glazing described above and it can be achieved using any number of vent configurations provided that air can enter at or near the front and that the glazing substantially prevents re-radiation from escaping.

It will be understood that the arrangements described above will operate effectively in a closed circuit energy conversion circuit or a high temperature thermal energy storage system.

However, in order to further enhance the performance of the central receiver provided according to the invention, and as illustrated in FIG. 3, the window may communicate with a parabolic reflector (14) arranged to concentrate reflected radiation from the heliostat field prior to its entry into the window.

In use, ambient air at atmospheric pressure is sucked into the receiver chamber in consequence of the action of the fan. This air passes through the arrangement of absorber tubes that are being simultaneously heated by reflected solar radiation impinging directly or indirectly on them. The absorber tubes, in turn heat the working fluid that is circulated through them.

As the ambient air at atmospheric pressure passes over the outside of the hot irradiated tubes it becomes heated and simultaneously has the effect of assisting in spreading the heat absorbed directly by the absorber tubes from the front thereof towards the rear. After the ambient air has passed through the chamber in this manner, it passes through the heat recovery heat exchanger and loses thermal energy to the working fluid before the working fluid enters the arrangement of absorber tubes. The ambient air at atmospheric pressure then arrives at the suction fan and may be discharged. Alternatively, it may be recycled to the inlet to the window in order to preserve heat that may still be carried by it. In the latter instance further heat may be conserved.

As regards the pressurized air that functions as the working fluid, this passes through the heat recovery heat exchanger first and gains heat in what may be regarded as a pre-heating stage before it proceeds to the series of absorber tubes passing through the chamber. The pressurized air then exits the final absorber tube in the chamber at the highest temperature achievable.

Due to the fact that the absorber tubes on the irradiated side are cooled by the ambient air, it is anticipated that higher solar flux densities may be accommodated with a consequent reduction in the size of the receiver and possibly costs. Also the ambient air flow stream aids in a more equalized temperature distribution around the periphery of each absorber tube being achieved as hot air on the irradiated side of the tube is dragged around the tube to the shadowed side and thus heats up the shadowed side while the irradiation side is cooled. Thus thermal stresses on the tube material are reduced and buckling of tubes is minimized.

The receiver according to the invention also makes use of the term called "volumetric effect". This effect has been investigated and documented for volumetric receivers where higher surface temperatures have been obtained at certain distances deeper into the absorber material. For lower frontal surface temperatures less re-radiation and convection losses occur and thus the receiver efficiency is increased. As shown in the drawings, the chamber can house a large number of absorber tubes, The number of absorber tubes plays an important role in the "volumetric effect", and the more absorber tubes present, the bigger the "volumetric effect" will be. A larger number of absorber tubes also reduces the amount of rays that hit the chamber walls. The central receiver of this invention can be used in any type of power cycle. Due to the fact that the primary working fluid flows in a closed circuit pipe network any type of fluid can be used, for example, molten salt, pressurized air, steam, carbon dioxide.

Figure 11:
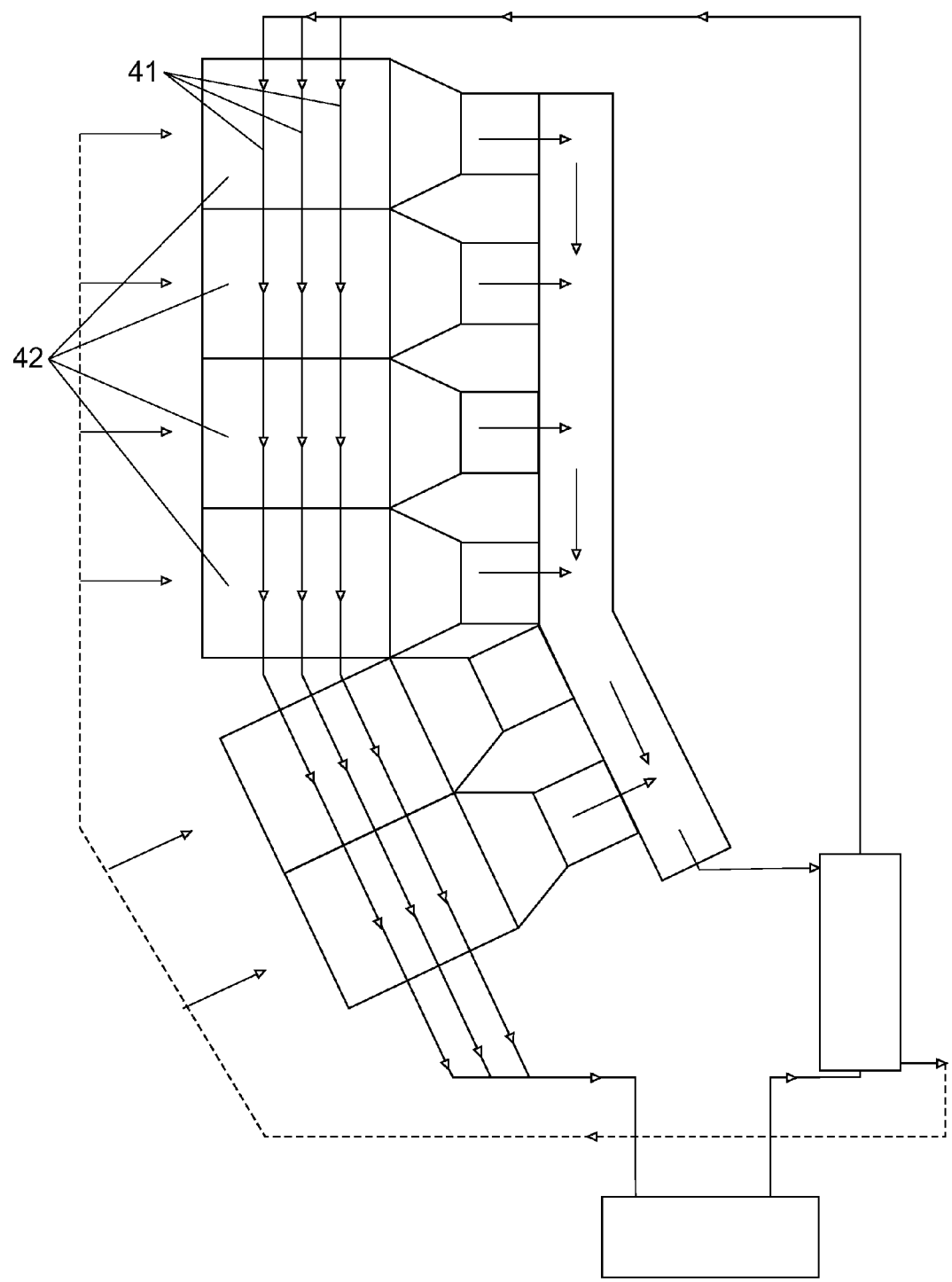

It is to be noted, and with reference to FIG. 11, the absorber tubes (41) can be linked in series or via headers depending on the system design where allowable flux density and mass flow rate play a significant role. Straight long tubes that pass through multiple cavities of multiple receivers (42) can be used to reduce pressure drop by reducing the number of bends. The multiple cavities aid in a more controlled air flow suction effect where flow instability is reduced. Also, they support the tubes from buckling under thermal load.

Numerous variations may be made to the proposed embodiment of the invention described above without departing from the scope hereof.

The invention claimed is:

1. A central receiver for a solar power facility, the central receiver comprising an arrangement of solar heat absorber tubes that form a solar heat absorber located in a chamber having a window that is to receive solar radiation reflected by a heliostat field in use and wherein the heat absorber tubes are arranged to receive radiant energy reflected by the heliostat field and the heat absorber tubes extend transversely relative to the window and are arranged to be connected into a working fluid circuit, wherein the window forms an atmospheric air inlet and the chamber has an atmospheric air outlet in a region opposite the window, and an air flow promoting unit for inducing a flow of atmospheric air inwards through the window, past the absorber tubes; and through the outlet, wherein the heat absorber tubes are arranged to receive solar radiation passing through the window, becoming hot irradiated tubes thereby, and wherein ambient air at atmospheric pressure passes over the outside of the hot irradiated tubes, becoming heated thereby.

2. A central receiver as claimed in claim 1 in which a heat recovery heat exchanger communicates with the outlet from the chamber so as to receive residual heat contained in atmospheric air passing through the outlet from the chamber, the heat recovery heat exchanger being connected into the working fluid circuit of the absorber tubes on the inlet side thereof so as to pre-heat working fluid flowing towards the absorber tubes.

3. A central receiver as claimed in claim 2 in which air leaving the heat recovery heat exchanger is recycled to the inlet to the window in order to preserve residual heat therein.

4. A central receiver as claimed in claim 1 in which the air flow promoting unit is a fan.

5. A central receiver as claimed in claim 1 in which the working fluid circuit is in a closed circuit.

6. A central receiver as claimed in claim 1 in which the absorber tubes are arranged in small groups of parallel absorber tubes that are in series with other small groups of parallel absorber tubes with one or a small group of absorber tubes being located in a position in which the internal temperature of a working fluid circulating through the absorber tubes is expected to be optimised or maximized.

7. A central receiver as claimed in claim 1 in which the absorber tubes are arranged in multiple groups with optionally varying numbers and spacing of absorber tubes in different rows.

8. A central receiver as claimed in claim 1 in which absorber tubes are connected to other absorber tubes in a sequence that is chosen to optimise or maximise the absorption of thermal energy with absorber tubes having the highest temperature in use being located forwardly of rearmost absorber tubes.

9. A central receiver as claimed in claim 1 in which the cross-sectional shape and size of the absorber tubes is selected to optimise or maximise the absorption of thermal energy and the temperature to which a working fluid circulating through the absorber tubes is heated.

10. A central receiver as claimed in claim 1 in which unpressurized louvers or panes are positioned in front of the absorber tubes to reflect radiation received from a heliostat field inwards into the chamber and towards the absorber tubes and to inhibit the escape of re-radiation energy emitted by absorber tubes.

11. A central receiver as claimed in claim 10 in which the unpressurized transparent louvers or panes are arranged so as to form a non-continuous front profile directed generally towards the heliostat field with individual louvers or panes having oblique frontal surfaces such that reflected rays travel towards the inside of the chamber of the receiver.

12. A central receiver as claimed in claim 10 in which the receiver includes multiple rows of unpressurized louvers or panes arranged to provide a leading row in which the temperature of the louvers or panes is, under operating conditions, maintained at a level low enough to reduce radiation losses.

13. A central receiver as claimed in claim 1 in which the window communicates with a compound parabolic or other reflector arranged to re-concentrate reflected radiation from the heliostat field prior to its entry into the window.

14. An assembly of central receivers as claimed in claim 1 in which a plurality of juxtaposed central receivers have straight long tubes that pass through them.

\* \* \* \* \*